United States Patent Office 3,705,156
Patented Dec. 5, 1972

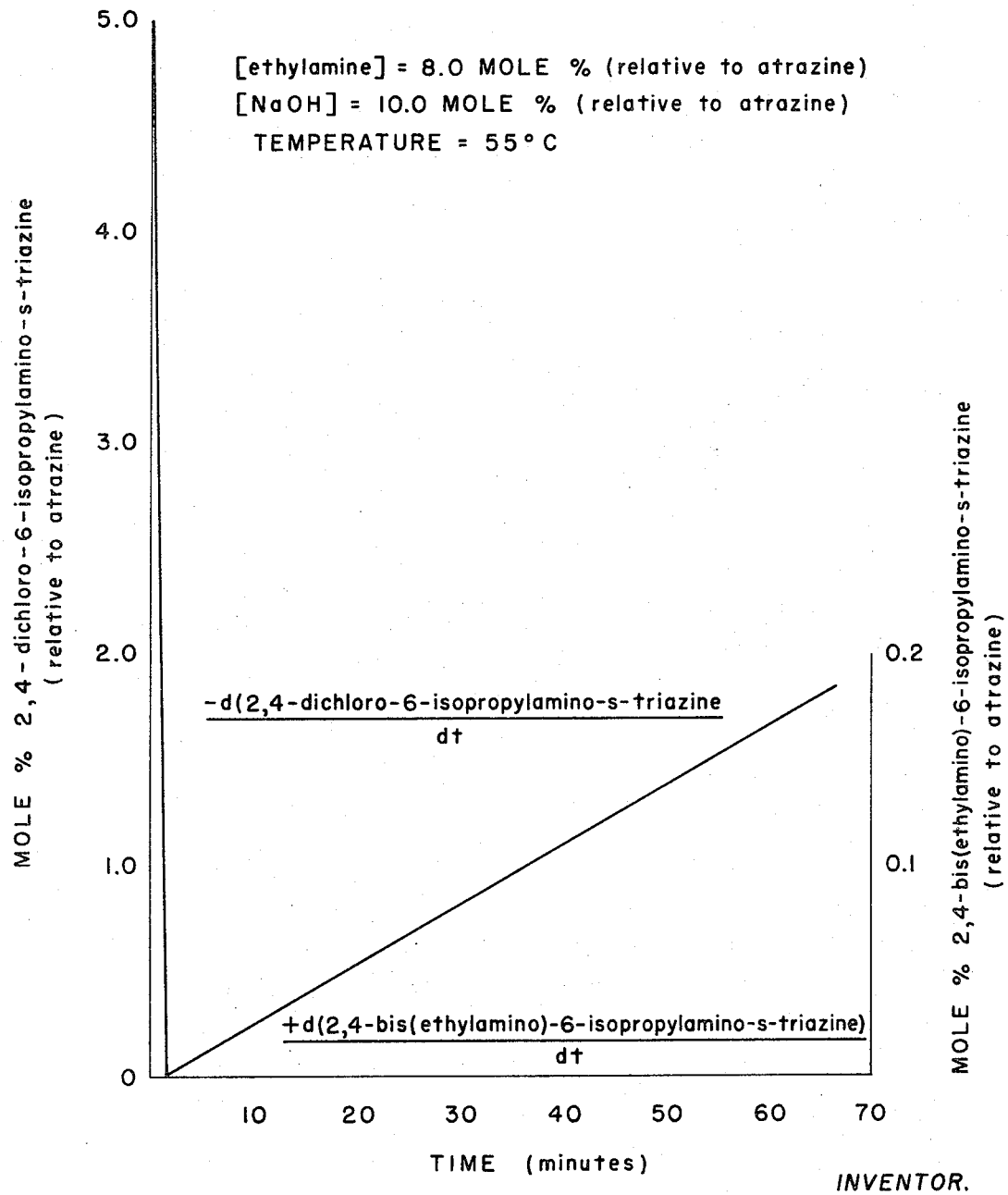

---

3,705,156
SUPPRESSION OF TRIS(ALKYLAMINO)-s-TRIAZINE FORMATION IN THE PRODUCTION OF CHLORO-BIS(ALKYLAMINO)-s-TRIAZINES THROUGH THE ADDITION OF FORMALDEHYDE
Harris E. Petree, Spanish Fort, Ala., assignor to Ciba-Geigy Corporation, Greenburgh, N.Y.
Filed Dec. 31, 1970, Ser. No. 103,251
Int. Cl. C07d 55/20
U.S. Cl. 260—249.8               5 Claims

ABSTRACT OF THE DISCLOSURE

The known commercial method of producing herbicidal chloro-bis((alkylamino)-s-triazines involves the use of cyanuric chloride as a starting material and the step-wise replacement of two chlorine atoms therefrom with alkylamino groups. One of the byproducts obtained is a tris(alkylamino)-s-triazine, which is formed by replacement of the third chlorine atom in cyanuric chloride. A method for suppressing the formation of tris(alkylamino)-s-triazines comprises the steps of (1) adding formaldehyde to the reaction mixture immediately after the chloro-bis(alkylamino)-s-triazine reaction is complete, thus forming a water-soluble addition product of the formaldehyde and the alkylamine, and (2) removing this addition product by subsequent distillation and filtration.

FIELD OF THE INVENTION

The present invention relates to an improved procedure for the preparation of chloro-bis(alkylamino)-s-triazines. In particular, it provides a method for the substantial reduction or elimination of tris(alkylamino)-s-triazines which are formed in small, but often significant, amounts as by-products in the commercial preparation of chloro-bis(alkylamino)-s-triazines.

BACKGROUND OF THE INVENTION

Chloro-bis(alkylamino)-s-triazine compounds having the following structure

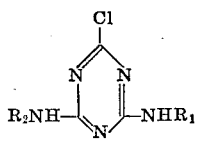

in which $R_1$ and $R_2$ independently represent lower alkyl, inhibit the growth of plants and are widely used as herbicides. The lower alkyl groups denoted by $R_1$ and $R_2$ are specifically those aliphatic and cycloaliphatic radicals of the formula $C_nH_{2n+1}$, where $n$ designates integer of less than 5; thus, they include methyl, ethyl, isopropyl, cyclopropyl, n-butyl, sec-butyl and tert-butyl. Especially valuable as herbicides are atrazine (2-chloro-4-ethylamino-6-isopropylamino-s-triazine), simazine (2-chloro-4,6-bis(ethylamino)-s-triazine), and propazine (2-chloro-4,6-bis(isopropylamino)-s-triazine). These compounds are employed both as selective herbicides for weed control among cultivated plants and as soil sterilents for the total elimination of undesired plant growth. Futrher details with respect to these and other chloro-bis(alkylamino)-s-triazines are set forth in U.S. Pat. No. 2,891,855.

These chloro-bis(alkylamino)-s-triazines are normally prepared from cyanuric chloride by stepwise substitution of two chlorine atoms by alkylamino groups. The first reaction proceeds according to the general scheme:

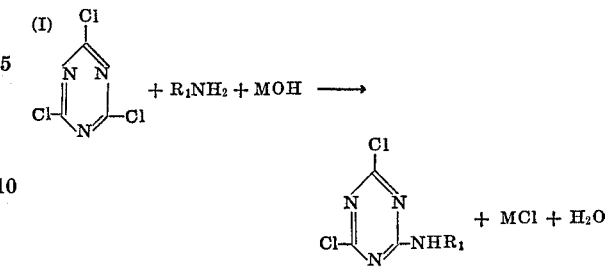

where M represents an alkali metal. The second reaction proceeds according to the scheme:

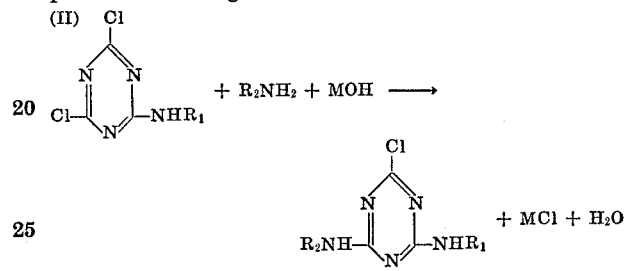

In the commercial preparation of atrazine, for example, cyanuric chloride is first reacted with isopropylamine and an alkali metal hydroxide, such as aqueous sodium hydroxide, to yield 2,4-dichloro-6-isopropylamino-s-triazine according to the following reaction:

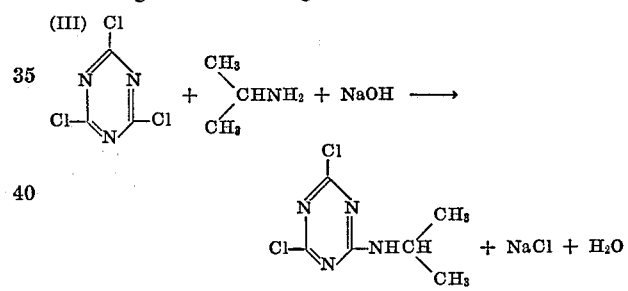

In this reaction substantially equimolar amounts of cyanuric chloride and isopropylamine are used, and the temperature is controlled within the range of from about 5° C. to 20° C. by means of refrigeration or the addition of ice. The 2,4-dichloro-6-isopropylamino-s-triazine intermediate is then reacted with ethylamine and additional sodium hydroxide to obtain the product, 2-chloro-4-ethylamino-6-isopropylamino-s-triazine, according to the following reaction scheme:

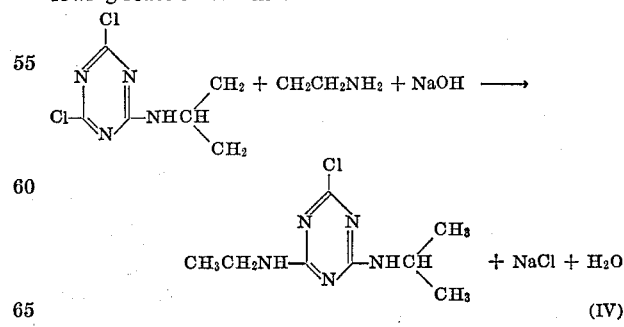

The temperature of this reaction is controlled in the range of about 40° C. to 65° C., preferably between 50° C. and 60° C. In this second reaction, a 15% excess of sodium hydroxide and a 1 to 5% excess of ethylamine, over their equimolar amounts, are used. The excess sodium hydroxide is for the purpose of maintaining a strongly alkaline medium, i.e., a pH at a level of from about 10.5 to about 12.5, preferably about 11.5 to 12. The excess ethylamine is used to insure that all of the 2,4-dichloro-6-isopropylamine-s-triazine is reacted. This dichloro compound is irritating to the skin; atrazine which is contaminated with more than 0.5% of this dichloro compound is not acceptable. The excess amount of ethylamine, plus the fact that reaction (IV) proceeds at a rapid rate, insures that none of this dichloro compound contaminates the final product.

In commercial practice, chloro-bis(alkylamino)-s-triazines such as 2-chloro-4-ethylamino-6-isopropylamino-s-triazine, are prepared according to two broad general methods. The first is a batch process in which both of the foregoing reactions take place in a single vessel; i.e., the cyanuric chloride is first converted to the dichloro-alkylamino-s-triazine intermediate and, after this reaction is complete, the intermediate is then converted to the chloro-bis(alkylamino) product. The second method is a continuous process in which the first reaction proceeds in one vessel and the intermediate product is transferred to a second vessel for the second reaction. Reaction conditions, such as temperature, pressure, and pH control, and the solvents used vary widely according to which method of preparation is being used. However, the basic chemical reactions and products remain the same.

In the second reaction, i.e., the conversion of the dichloro-alkylamino-s-triazine to the chloro-bis(alkylamino)-s-triazine, one of the by-products is a tris(alkylamino)-s-triazine, which forms from the reaction of the chloro-bis(alkylamino)-s-triazine product with an additional molecule of the alkylamine. Thus, in the preparation of atrazine, illustrated above, small amounts of 2,4-bis(ethylamino)-6-isopropylamino-s-triazine are formed by the replacement of the chlorine atom in the desired product by an additional ethylamino group. 2,4-bis(ethylamino)-6-isopropylamino-s-triazine is a waxy substance and, even in relatively small amounts, interferes seriously with the filtration of the desired product. Furthermore, this by-product impairs the stability and flowability of flowable atrazine formulations.

The tris(alkylamino)-s-triazine by-product can be formed in two ways. First, it may be formed in small amounts during the second reaction in competition with additional 2-chloro-bis(alkylamino)-s-triazine product; some of the ethylamine will react with the already formed product rather than reacting with the dichloro-alkylamino-s-triazine. Fortunately, the conversion of chloro-bis (alkylamino)-s-triazines to tris(alkylamino)-s-triazines proceeds at a considerably slower rate than the conversion of dichloro-alkylamino-s-triazines to chloro-bis (alkylamino)-s-triazines. Thus, by proper and careful limitation of reaction times, temperature and pressure—and by having only a very slight molar excess of alkylamine, e.g., no more than about 0.1% excess—it is possible to obtain a final product in which the tris(alkylamino)-s-triazine content is acceptable. In actual commercial practice, however, it is not always feasible to control the reaction conditions and the amount of alkylamine excess to the close degree necessary to attain acceptable levels of tris(alkylamino)-s-triazine formation. Thus, in order to insure that all of the dichloro-alkylamino-s-triazine is reacted, one must, in practice, use at least a 1%, and preferably a 2 to 5%, molar excess of alkylamine. In commercial practice, an excess of about 3% is used. The second and more significant way in which the tris(alkylamino)-s-triazine by-product is formed occurs after all of the dichloro-alkylamino-s-triazine has been converted to the chloro-bis(alkylamino)-s-triazine product. The excess alkylamine reacts with the product to form the tris(alkylamino) by-product.

In the preparation of atrazine, after the replacement of the second chlorine atom with the ethylamino group is complete, one obtains a slurry containing, inter alia, the desired product, unreacted ethylamine, the organic solvent for the cyanuric chloride starting material, sodium hydroxide, and small amounts of 2,4-bis(ethylamino)-6-isopropylamino-s-triazine as a by-product. In practice, this slurry is transferred to a holding tank from which the solvent is removed by distillation. The desired product is then recovered by filtration. In the slurry tank and in subsequent high-temperature distillation, the 2-chloro-4-ethylamino-6-isopropylamino-s-triazine product and the unreacted ethylamine react to form additional tris(alkylamino) by-product, the amount formed being a function of the contact time, pH and amine excess. If this additional contact time at strongly alkaline pH could be eliminated, the amount of tris(alkylamino) by-product formed would probably be at acceptably low levels. However, becaues in actual practice, the stripping and filtration process requires a length of time in excess of 30 minutes, it would be desirable to remove the unreacted ethylamine either in the slurry holding tank or prior to the transfer of the slurry into said holding tank.

Accordingly, it is an object of this invention to provide in a process for the manufacture of chloro-bis(alkylamino)-s-triazines, a method for rapid deactivation of unreacted alkylamine, thus averting the formation of tris-(alkylamino)-s-triazines. It is a further object of this invention to provide a process for preparing chloro-bis(alkylamino)-s-triazines which are substantially free of contamination by tris(alkylamino)-s-triazines.

SUMMARY OF THE INVENTION

In the present invention, formaldehyde, in an amount in slight excess of the excess alkylamine is added to the product slurry. This converts the excess alkylamine to a water-soluble addition product. This addition product is removed during the distillation and filtration steps.

DETAILED DESCRIPTION OF THE INVENTION

The presence of small amounts of tris(alkylamino)-s-triazines in the final 2-chloro-4,6-bis(alkylamino)-s-triazine products has not heretofore been a serious problem. However, there have recently been developed new solid and flowable formulations of these herbicidal triazines which are characterized by greatly increased ease of handling and application and by improved herbicidal effectiveness. The presence of tris(alkylamino)-s-triazine impurities in these new formulations at levels above about 0.1% of the total triazine product causes some difficulties in storage and handling. Accordingly, it is necessary—in order to take advantage of the improvements available by use of these new formulations—to produce 2-chloro-4,6-bis(alkylamino)-s-triazine herbicides which contain no more than about 0.1% of tris(alkylamino)-s-triazines. The tris(alkylamino)-s-triazine concentration should be below 0.1% and preferably below 0.05% based on the weight of total triazines present.

By proper control of the reaction time and conditions during reaction (II) described above, one can obtain a 2-chloro-4,6-bis(alkylamino)-s-triazine product slurry in which the level of tris(alkylamino)-s-triazine impurity is below 0.05% and in some cases even non-detectable (i.e., less than 0.01%). This product slurry, containing, inter alia, the 2-chloro-4,6-bis(alkylamino)-s-triazine product and the unreacted alkylamine (present because of the 1 to 5% excess used), is transferred first to a holding tank, then to a solvent stripping column, and then to a filter on which the final product is separated. While the slurry is in the holding tank, the slow reaction between the desired and the unreacted alkylamine takes place, resulting in the formation of additional tris(alkylamino)-s-triazine. If the slurry holding tank could be eliminated, i.e., if the reaction slurry could proceed from the reactor directly to the filtering and stripping media, the problem of additional tris(alkylamino)-s-triazine formation would be obviated. However, in commercial practice, particularly with batch reactors, this is not feasible. It is therefore necessary to remove or otherwise deactivate (i.e., quench) the unreacted alkylamine as soon as possible after reaction (II) is complete.

This is accomplished by adding to the product slurry sufficient formaldehyde to condense with the unreacted alkylamine according to reactions (IV) and (V).

(IV) 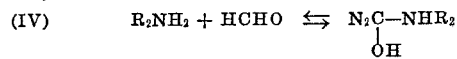

(V) 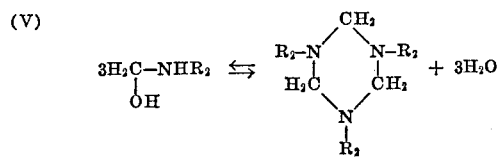

In practice, an excess of formaldehyde (relative to the amount of alkylamine excess) is added to insure that all of the unreacted alkylamine is removed. A molar excess of from about 1% to 100% or more may be used, but it is convenient to use a molar excess of from 50 to about 100%. With the alkylamine converted to its formaldehyde addition products, it is no longer available to react with the 2-chloro-4,6-bis(alkylamino)-s-triazine product. The alkylamine/formaldehyde addition products, being water-soluble, are easily removed in the distillation and filtration steps.

The addition of the formaldehyde should take place as soon as possible after the completion of the reaction in which the 2-chloro-4,6-bis(alkylamino)-s-triazine product is formed. Preferably, the addition of the formaldehyde should be done within 30 minutes, more preferably within 10 minutes, after termination of reaction (II).

Both reactions described above and the formaldehyde are equilibrium reactions. Formation of the alkylamine/formaldehyde adduct is favored in strongly alkaline solution. Accordingly, steps should be taken to ensure that the product slurry remains strongly alkaline, i.e., at a pH of at least about 11.5. This can conveniently be done by the addition of an alkali metal hydroxide such as sodium hydroxide if the pH should drop below the desired level.

After the formaldehyde has been added and maintenance of the proper pH is assured, the organic solvent (for the cyanuric chloride starting material) is removed in the usual manner, by distillation. Some alkylamine is removed with this solvent. And, lastly, the insoluble 2-chloro-4,6-bis(alkylamino)-s-triazine product is removed from the remaining aqueous slurry (now containing the remaining alkylamine/formaldehyde addition products) by filtration and subsequent washing in the usual manner.

The following examples are intended to illustrate some of the theory and embodiments of the present invention. The examples therefore are for illustrative purposes only and are not to be construed as limitations.

EXAMPLE 1

This example illustrates the rates of formation of atrazine (2-chloro-4-ethylamino - 6 - isopropylamino-s-triazine) and the 2,4-bis(ethylamino)-6-isopropylamino-s-triazine by-product during the reaction of 2,4-dichloro-6-isopropylamino - s - triazine with ethylamine (reaction (IV) described above). To a 250 ml. Erlenmeyer flask, thermostated by water bath at 55° C. and equipped with a magnetic stirrer, was charged 102 g. of water, 19.2 g. of sodium chloride, 75.2 g. of methylethylketone, 1.70 g. of 2,4-dichloro - 6 - isopropylamino-s-triazine (5% molar excess relative to a normal atrazine change), 8.9 g. of atrazine, 0.84 g. of ethylamine (8% molar excess relative to a normal atrazine change) and 1.33 g. of sodium hydroxide (10% excess). The contents of the flask are representative of the contents of the reactor during the second stage of the commercial preparation of atrazine. The amount of atrazine was reduced considerably in order to facilitate sampling and analysis. However, there was a considerable amount of atrazine present in the water/methylethylketone slurry. The disappearance of the 2,4-dichloro-6-isopropylamino-s-triazine and the appearance of the trisamino impurity, 2,4-bis(ethylamino)-6-isopropylamino-s-triazine, were followed by gas chromatographic analysis of the methylethylketone layer. The accompanying drawing is the plot of the disappearance of the 2,4-dichloro intermediate and the subsequent appearance of the tris(alkylamino) by product as a function of time. The data indicate that the replacement of the 4-chlorine atom in 2,4-dichloro-6-isopropylamino-s-triazine with an ethylamino group, thus producing atrazine, is substantially complete in less than two minutes. The reaction of atrazine with the excess ethylamine and the subsequent formation of 2,4-bis(ethylamino)-6-isopropylamino-s-triazine proceeds at a considerably slower rate. Thus, if the excess ethylamine could be physically removed within, say, about 30 minutes after the atrazine reaction is complete, the amount of 2,4-bis(ethylamino)-6-isopropylamino-s-triazine formed would be below about 0.1 mole percent and thus would be acceptable for most purposes, particularly for formulation purposes. However, since physical removal of the excess ethylamine within this time period is not always feasible, it would be desirable to develop a method of quenching, i.e., deactivating, the ethylamine so as to prevent formation of this tris(alkylamino) by-product.

EXAMPLE 2

The use of formaldehyde to quench excess alkylamine was evaluated in the production of atrazine. The product was produced under laboratory conditions by the usual commercial method of step-wise replacement of two chlorine atoms in cyanuric chloride with isopropylamino and ethylamino groups, respectively. In the second reaction, excess ethylamine in amounts of 2.0 and 5.0% relative to atrazine were used; there was also a run in which only the stoichiometric amount (no excess) of ethylamine was used. The solvent employed was methylethylketone and the reaction temperature was kept at 50° C. by means of the addition of ice. In the runs with excess ethylamine, a 100% excess of formaldehyde (relative to the amine excess) was added immediately after the second reaction was complete. In addition, sufficient sodium hydroxide was added in order to maintain the pH of the slurry at about 11.5. After allowing a post-reaction time of three hours, the methylethylketone solvent was stripped and the atrazine product recovered in the usual manner. The amount of 2,4-bis(ethylamino)-6-isopropylamino-s-triazine (reported as "tris") and the hydroxytriazines (reported as "hydroxy") were noted. The results are set forth in Table I, "ND" standing for "non-detectable."

TABLE I

| Run | Mole percent, excess of— | | Percent | | Dry cake | |
| --- | --- | --- | --- | --- | --- | --- |
| | EtNH₂ ᵃ | HCHO ᵃ | EtHN₂ in solvent ND <.001% | Tris in filtrate | ND .01% | Percent hydroxy |
| 1 | 0 | 10.0 | ND | 0.01 | ND | 0.03 |
| 2 | 5 | 10.0 | 0.22 | 0.02 | 0.05 | 0.03 |
| 3 | 2 | 4.0 | 0.12 | 0.03 | 0.03 | |

ᵃ Relative to atrazine.

These data indicate that formaldehyde effectively quenches the excess ethylamine used in the second reaction. The amount of 2,4-bis(ethylamino) - 6 - isopropylamino-s-triazine found in the final atrazine dry cake in Runs 2 and 3 is well below the desirable upper limit of 0.1%.

EXAMPLE 3

The process of this invention is also applicable to triazine herbicides other than atrazine, which are produced by the step-wise replacement of two chlorine atoms in cyanuric chloride by alkylamino groups. Examples of these other triazine herbicides and their method of manufacture are listed in Table II, which indicates the order of replacement of the two chlorine atoms in cyanuric chloride according to reactions (I) and (II) described above. In all cases, reaction (II) employs alkylamine in an excess of about 3%.

TABLE II

| Triazine herbicide product | First alkylamine (reaction I) | Second alkylamine (reaction II) |
| --- | --- | --- |
| 2-chloro-4,6-bis(isopropylamino)-s-triazine (propazine). | Isopropylamine | Isopropylamine. |
| 2-chloro-4,6-bis(ethylamino)-s-triazine (simazine). | Ethylamine | Ethylamine. |
| 2-chloro-4-sec-butylamino-6-ethylamino-s-triazine. | Sec-butylamine | Do. |
| 2-chloro-4-tert-butylamino-6-ethylamino-s-triazine. | Tert-butylamine | Do. |

After reaction (II) is complete, an 80% molar excess of formladehyde (relative to the excess ethylamine or isopropylamine present) is added to the product slurry. Sufficient sodium hydroxide is added to maintain the pH of the slurry at about 11.5. After allowing a post-reaction hold time of about two to three hours, the organic solvent (for the cyanuric chloride reactant) is removed by distillation and the triazine herbicide product is recovered by filtration. The alkylamine/formaldehyde adducts are removed during the distillation and filtration steps.

I claim:

1. In a process for preparing chloro-bis(alkylamino)-s-triazines in a strongly alkaline medium by means of the step-wise replacement of two chlorine atoms of cyanuric chloride with alkylamino groups and in which the second alkylamine is present in a molar excess of at least 1%, the method of suppressing the formation of tris(alkylamino)-s-triazines which comprises adding to the reaction mixture, after the second chlorine atom has been replaced with an alkylamino group, formaldehyde in an amount sufficient to react with the excess alkylamine thus forming water-soluble formaldehyde/alkylamine adducts.

2. The method of claim 1 in which the formaldehyde is added to a molar excess of from about 50% to 100% relative to the excess of alkylamine present.

3. In a process for preparing 2-chloro-4-ethylamino-6-isopropylamino-s-triazine in a medium having a pH of from about 11.0 to 12.5 by means of the step-wise replacement of two chlorine atoms of cyanuric chloride with an isopropylamino group and an ethylamino group and in which the ethylamine is present in a molar excess of from about 1% to about 5%, the method of suppressing the formation of 2,4-bis(ethylamino)-6-isopropylamino-s-triazine which comprises adding to the reaction mixture, after the second chlorine atom has been replaced with an ethylamino group, formaldehyde in an amount sufficient to react with the excess ethylamine in order to form water-soluble formladehyde/ethylamine adducts.

4. The method of claim 3 in which the formaldehyde is added in a molar excess of from about 50% to 100% relative to the excess ethylamine present.

5. The method of claim 3 in which the pH of the reaction mixture is maintained at from about 11.5 to 12.0.

References Cited

UNITED STATES PATENTS 3,590,040  6/1971  Ferguson et al. _____ 260—249.8

JOHN M. FORD, Primary Examiner

U.S. Cl. X.R.

71—93